W. TRABUE.
RESILIENT WHEEL.
APPLICATION FILED NOV. 18, 1913.

1,125,767.

Patented Jan. 19, 1915.

WITNESSES
Howard D. Orr

William Trabue, INVENTOR,
BY E. G. Siggers
ATTORNEY

UNITED STATES PATENT OFFICE.

WILLIAM TRABUE, OF LOUISVILLE, KENTUCKY, ASSIGNOR, BY DIRECT AND MESNE ASSIGNMENTS, TO PNEUMATIC HUB-TIRE-WHEEL CO., OF LOUISVILLE, KENTUCKY, A CORPORATION.

RESILIENT WHEEL.

1,125,767.  Specification of Letters Patent.  Patented Jan. 19, 1915.

Application filed November 18, 1913.  Serial No. 601,724.

*To all whom it may concern:*

Be it known that I, WILLIAM TRABUE, a citizen of the United States, residing at Louisville, in the county of Jefferson and State of Kentucky, have invented a new and useful Resilient Wheel, of which the following is a specification.

The invention relates to improvements in resilient wheels.

The object of the present invention is to improve the construction of resilient wheels, and to provide a simple, practical and efficient resilient wheel, designed for use on automobiles and other motor vehicles, and the like, and equipped with a cushioned inner hub and adapted to afford the resiliency of a pneumatic tire, and capable of eliminating punctures and similar tire troubles and reducing the cost of the upkeep of resilient wheels.

With these and other objects in view, the invention consists in the construction and novel combination of parts hereinafter fully described, illustrated in the accompanying drawing, and pointed out in the claim hereto appended; it being understood that various changes in the form, proportion, size and minor details of construction, within the scope of the claim, may be resorted to without departing from the spirit or sacrificing any of the advantages of the invention.

Figure 1:
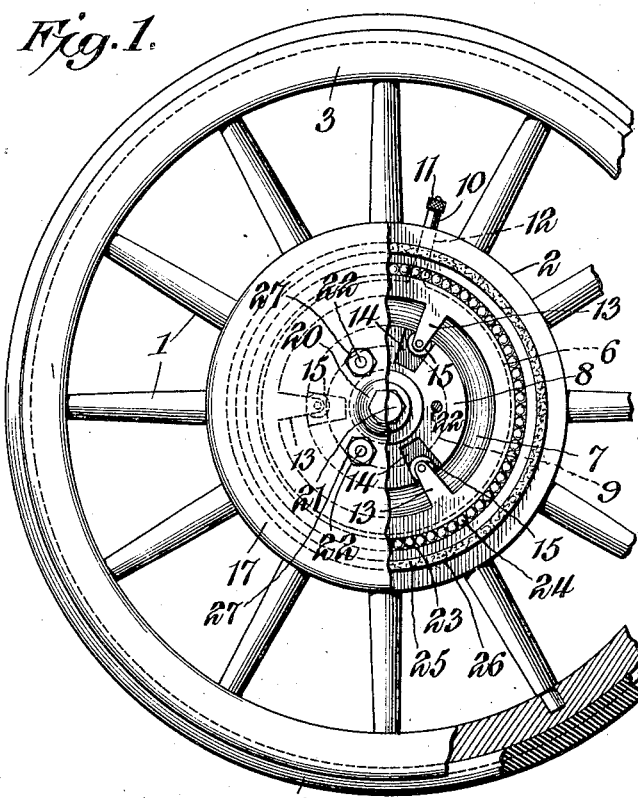
Figure 2:
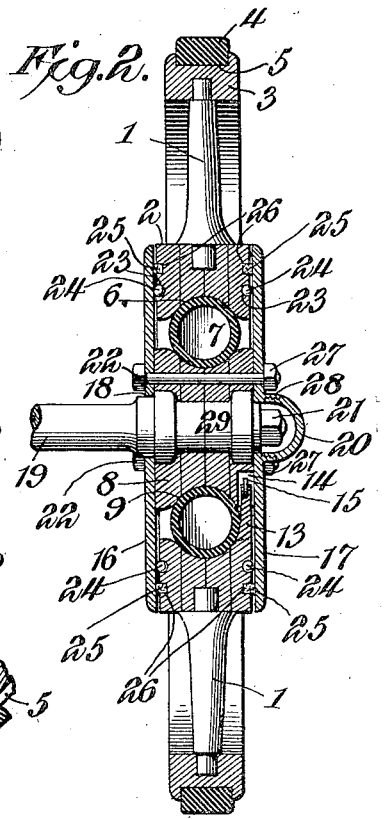
Figure 3:
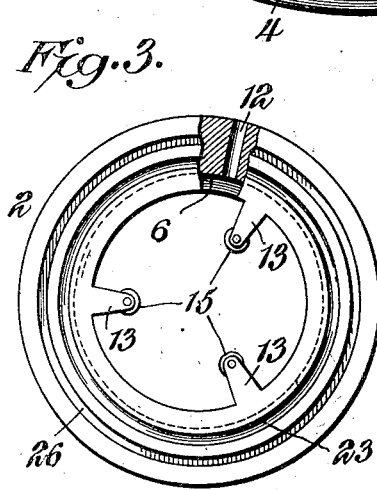
Figure 4:
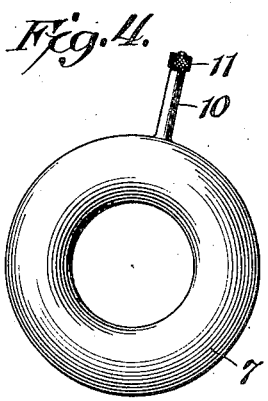
Figure 5:
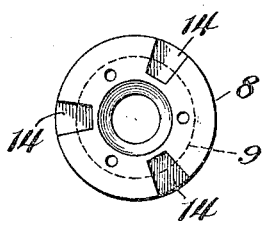

In the drawing:—Figure 1 is a side elevation partly in section of a resilient wheel, constructed in accordance with this invention. Fig. 2 is a central vertical sectional view. Fig. 3 is a detail view of the outer hub member. Fig. 4 is a similar view of the annular cushion. Fig. 5 is a detail view of the inner hub member.

Like numerals of reference designate corresponding parts in all the figures of the drawing.

In the accompanying drawing in which is illustrated the preferred embodiment of the invention, the resilient wheel comprises in its construction spokes 1, secured at their inner ends to an outer annular hub member 2 and connected at their outer ends to a felly 3, which is equipped with a tire 4 constructed of solid rubber or other suitable material. The spokes, the outer hub member and the felly 3 constitute the body portion of the wheel and may be of any preferred construction. The felly 3 is provided in its outer periphery with a circumferential recess 5 in which the tire 4 is seated, but any other suitable means may be employed for retaining the tire on the wheel.

The outer annular hub member 2, which may be constructed of wood or any suitable material, has flat side faces and is provided in its inner peripheral edge with an annular groove 6 conforming to the configuration of and fitting the outer portion of an annular pneumatic cushion 7, which is interposed between the outer hub 2 and an inner hub member 8. The inner hub member 8, which is in the form of a spool, may also be constructed of wood or any other suitable material, and it is provided in its outer periphery with an annular groove 9, conforming to the configuration of and forming a seat for the inner portion of the annular cushion 7. The annular cushion consists of a pneumatic tube having a valve stem 10 equipped with an air inlet or inflating valve 11 and extending radially of the wheel from the outer periphery of the annular cushion through a radial opening 12 in the outer hub member 2 and located between two of the spokes 1. By this construction, the valve is arranged out of the way and is not liable to be broken or otherwise injured through contact with any object. Also the radial opening 12 will enable the valve stem to readily pull out of the outer hub without injury should the pneumatic cushion through any cause, such as long usage, collapse.

The annular cushion may be of any preferred construction, and the inner and outer hub members are spaced apart and have relative movement radially of the wheel to enable the pneumatic cushion to cushion the wheel in all directions and absorb shocks and jars. Also relative movement of the inner and outer hub members circumferentially of the wheel to avoid wearing or otherwise injuring the pneumatic cushion is prevented by a plurality of lugs 13, extending inwardly from the outer hub member 2 at the outer face thereof and projecting into inwardly tapered recesses 14 in the outer end face of the inner hub member or spool 8. The inwardly tapered recesses, which are of a width greater than the lugs, provide a limited circumferential movement or play to prevent any locking of the inner and outer hub members 2 and 8, and the said lugs are equipped with antifriction wheels 15, adapted to ride on the walls of the recesses and thereby render the relative radial movement of the hub members frictionless. The lugs and the projecting antifriction wheels, which are located at the inner terminals of the lugs, are of a combined length greater than the depth of the recesses, so that in event of the collapse of the annular cushion, the lugs will operate to space the inner and outer hub members from each other a sufficient distance to relieve the pneumatic cushion of the crushing and grinding action, which would necessarily result if the relative radial movement of the inner and outer hub members were not limited and the collapsed cushion subjected to the entire weight of the vehicle.

The outer hub member 2 is guided between inner and outer side plates 16 and 17, preferably in the form of disks, the inner side plates 16 being provided with a central opening 18 to permit the wheel to be arranged on an axle 19, and the outer side plate having a removable cap 20, which fits over the axle nut 21. The inner and outer side plates are secured by a plurality of transverse bolts 22 to the end faces of the inner hub member or spool, which spaces the side plates apart sufficiently to receive the outer hub section 2. The outer hub section 2 is provided at its inner and outer side faces with annular grooves 23 forming races for annular series of antifriction balls 24, interposed between the outer hub section 2 and the inner faces of the side plates and adapted to permit the outer hub section to move frictionlessly between the side plates in the cushioning action of the wheel. In order to exclude dust and other accumulation from the antifriction balls, annular gaskets 25 are also interposed between the outer hub member and the side plates. The annular gaskets, which are constructed of felt or other suitable material, are seated in annular grooves 26 in the outer hub section 2 and are located beyond the antifriction balls and concentric therewith, as clearly illustrated in Fig. 1 of the drawing. The transverse bolts 22 are provided at their outer ends with nuts 27, which are adapted to be removed to permit the outer plate to be detached for affording ready access to the interior of the wheel for repairing the pneumatic cushion or for any other purpose. In making a repair of this character, the wheel is first removed from the axle, the cap 20 being detachable to afford access to the axle nut. The cap 20 is threaded and engages threads of an annular flange 28, surrounding the central opening in the outer side plate 17. After the wheel is removed it is placed in a horizontal position, and the outer plate may then be detached without disturbing the antifriction balls. The inner hub 8 is equipped with the ordinary journal bearing 29 to receive the spindle of the axle 19, but the inner hub member may be mounted on the axle in any other manner, and the wheel is adapted for use either on the front axle of an automobile or other vehicle, or on the rear or driving axle of the same and when used on the driving axle will be suitably fixed to the same.

What is claimed is:—

A resilient wheel including an inner hub member provided with a plurality of radially arranged inwardly tapered recesses, an outer hub member having a central opening to receive the inner hub member and arranged in spaced relation with the same, an annular cushion interposed between the hub members, lugs projecting inwardly from the outer hub member and extending across the space between the said hub members and into the recesses of the inner hub member, antifriction devices carried by the lugs and arranged to ride on the walls of the said recesses, and side plates arranged at the side faces of the hub members and spanning the space between the same and covering the said recesses.

In testimony, that I claim the foregoing as my own, I have hereto affixed my signature in the presence of two witnesses.

WILLIAM TRABUE.

Witnesses:
JAMES P. BROWN,
D. MOXLEY.